United States Patent [19]

Stewart et al.

[11] 3,895,322

[45] July 15, 1975

[54] TONE CONTROLLED COMPANDORED SYSTEM

[75] Inventors: James A. Stewart, Menlo Park; Neale A. Zellmer, Belmont, both of Calif.

[73] Assignee: GTE Automatic Electric Laboratories Incorporated, Northlake, Ill.

[22] Filed: Mar. 14, 1974

[21] Appl. No.: 450,956

[52] U.S. Cl. .................... 333/14; 323/74; 330/145; 333/16

[51] Int. Cl. .................... H04b 1/64

[58] Field of Search ............ 333/14, 16; 325/62, 65; 179/1 D, 1 P

[56] References Cited

UNITED STATES PATENTS

| | | | |
|---|---|---|---|
| 2,407,259 | 9/1946 | Dickiesom | 333/16 X |
| 3,456,191 | 7/1969 | Rodenburg et al. | 333/16 X |
| 3,458,815 | 7/1969 | Becker | 333/16 X |

*Primary Examiner*—Paul L. Gensler
*Attorney, Agent, or Firm*—Leonard R. Cool; Russell A. Cannon

[57] ABSTRACT

A fixed power level frequency pilot tone, typically 4000 Hz, is inserted into the transmission baseband closely associated with each voice channel of a multichannel telephone cable system. The fixed-frequency pilot tone is a control signal that is transmitted through a voice transmitter compressor of a compandor system, together with the voice signal, and the pilot control signal is utilized at the voice receiver end to correctly expand the voice signal back to the required signal power level. The doubling of a transmission error of a conventional 2:1 compandor system is substantially reduced, being typically held to a few tenths of a dB.

11 Claims, 5 Drawing Figures

4,895,322

Sheet 1

| $P_{in}$* (ave) | $P_o$ (1) | $P_o$ (2) | $P_o$ (3) |
|---|---|---|---|
| 0 | -25 TO +5.0 | -28 TO + 1.8 | - 0.8 TO + 0.8 |
| -10 | -15.5 TO - 6. | -13.3 TO -8.1 | -10.4 TO -9.4 |
| -20 | -26 TO -16 | -23.1 TO -17.9 | -20. TO -19. |
| -30 | -36 TO -25.5 | -34.4 TO -27.2 | -29.1 TO -28.1 |
| -40 | -46 TO -35.5 | | |
| -50 | -57 TO -46.0 | | |
| -55 | -62.5 TO -51.5 | | |

* INTERRUTED 1 kHz (1) SELECTIVE READING VOLTMETER TUNED TO 1 kHz.

(2) AVERAGE READING VOLTMETER.

(3) RMS VOLTMETER.

| CONTINUOUS POWER 1 kHz $P_{in}$(dBm) | $P_o$(dBm) | CONTINUOUS POWER 300 Hz $P_{in}$(dBm) | $P_o$(dBm) | CONTINUOUS POWER 3 kHz $P_{in}$(dBm) | $P_o$(dBm) |
|---|---|---|---|---|---|
| LINE LOSS = 0 dB | | | | | |
| 0 | +0.6 | 0 | +0.1 | 0 | -0.9 |
| -10 | -10.2 | -10 | -10.7 | -10 | -11.5 |
| -20 | -20.2 | -20 | -20.7 | -20 | -21.4 |
| -30 | -30. | -30 | -30.5 | -30 | -31.4 |
| -40 | -40.2 | -40 | -40.7 | -40 | -41.6 |
| -50 | -50.9 | -50 | -51.6 | -50 | -52. |
| -55 | -57. | -55 | -57.8 | -55 | -57.3 |
| LINE LOSS = 10 dB | | | | | |
| 0 | +0.1 | 0 | -0.3 | 0 | -1.4 |
| -10 | -10.5 | -10 | -11.0 | -10 | -11.8 |
| -20 | -20.5 | -20 | -21.0 | -20 | -21.8 |
| -30 | -30.6 | -30 | -30.9 | -30 | -31.8 |
| -40 | -40.8 | -40 | -41. | -40 | -52. |
| -50 | -51.8 | -50 | -52.3 | -50 | -52.6 |
| -55 | -57.8 | -55 | -59 | -55 | -58.2 |

FIG. 4

TONE CONTROLLED COMPANDORED SYSTEM

BACKGROUND OF THE INVENTION

Compressor and expander systems, together designated as a compandor system, suitable for cable telephone multichannel subscriber systems are classified in Class 333, Subclass 14. Additional communication inventions embodying tone control signals and compandor systems are classified in Class 179/1 and Classes 325/65, 325/61, 330/86, 330/107 and 333/17.

Basically, the telephone compandor is a two-unit device having a voice signal compressor at the transmitter end and an expander at the receiver end of the telephone circuit. The compressor reduces the intensity range of the transmitted signals and the expander restores the voice signals to their original intensity range. The compandor has a control ratio measured by the ratio of the amount of voice signal intensity on compression and on expansion.

However, in the prior art systems the operation of the expander is controlled by voice frequency energy alone and any gains or losses resulting from the transmission media, such as a conventional telephone line, would be expanded according to the expansion ratio of the expander. For example, a typical compressor may have a compression ratio of 2 to 1 with the expander having a corresponding expansion ratio of 1 to 2. In such a case if 1 dB of loss is inserted through the intervening transmission circuits, the expander will expand the transmission error by a factor of 2 resulting in a 2 dB error.

Prior art compandor systems are shown for example in U.S. Pat. No. 3,735,290 issued May 22, 1973 to N. Yamayaki which discloses a compressor and expanding compandor circuit capable of performing optimum signal compression and/or expansion without causing signal distortion basically explained by the characteristic curve of a control element used in the variable frequency characteristic changing circuit for varying frequency response. Both compressor and expander circuits have the same construction. The two circuits can be best operated in sequential states by a switch-over operation, as in magnetic recording and reproducing apparatus.

Reference is also made to U.S. Pat. No. 3,377,559, issued Apr. 9, 1968 to J. A. Stewart, which discloses compandoring techniques for high frequency radio circuits. The carrier frequency modulated according to the degree of signal compression and then amplitude modulated with the compressed signals to provide a composite wave which carries not only the compressed signals but also an indication of the degree of expansion necessary to restore the compressed signal to its original form.

Still further, U.S. Pat. No. 3,304,369 issued Feb. 14, 1967 to J. A. Dreyfus discloses an improved method and means for normalizing the number of possible levels of phonetic sounds to a considerably reduced number, and then classifying such sounds to actuate a printer. It is proposed to construct a dynamic modifier for expanding or compressing the wave train of a signal derived from sound and particularly suited for use in conjunction with sound operated printers or the like.

SUMMARY OF THE INVENTION

The tone controlled compandor of this invention provides for the insertion of an audio frequency pilot tone at a constant known power level into a baseband of each channel of a multichannel telephone cable system. The compressor at the transmitting terminal includes first and second diode variable loss devices series-connected to vary the impedance thereof in response to a direct current control signal that is a function of the voice signals. The voice signal components having frequencies within the voice signal passband of the channel pass through the first variable loss device. The pilot tone, typically 4000 Hz, has a frequency outside the voice passband but within the bandwidth of the channel and is passed through the second variable loss device. The pilot tone also has a known reference power level. The voice signals and the pilot tone are combined for transmission to output means having a variable loss device responsive only to the pilot tone for compensating for gains or losses in the transmission media, the output means then expanding the volume range of the voice signals to a predetermined level. The pilot tone received at the receiving terminal carries not only the information relating to the compression ratio, but also carries information relating to any losses inserted by the transmission media.

An object of the invention is to provide means for inserting at the compressor a pilot tone of a known reference power level at a predetermined frequency outside the voice passband, for controlling the expander at the receiving terminal in response to the pilot tone transmitted.

Another object of this invention is to provide a means of proportionally controlling the audio output of a cable telephone signal in a compandor system.

A further object of the invention is to provide a compressor having first and second variable loss devices with the voice signals passing through the first variable loss device and a pilot tone passing through the second variable loss device.

Other objects, features, and advantages of the invention will become apparent in the following description taken in conjunction with the drawings.

BRIEF DESCRIPTION OF THE DRAWINGS

FIG. 2 is a portion of the schematic diagram of FIG. 1 showing the variolossers and variolosser control circuit;

FIG. 4 and FIG. 5 are tabulations of experimental results obtained by testing a compandor embodying this invention.

DESCRIPTION OF THE PREFERRED EMBODIMENT

Figure 1:
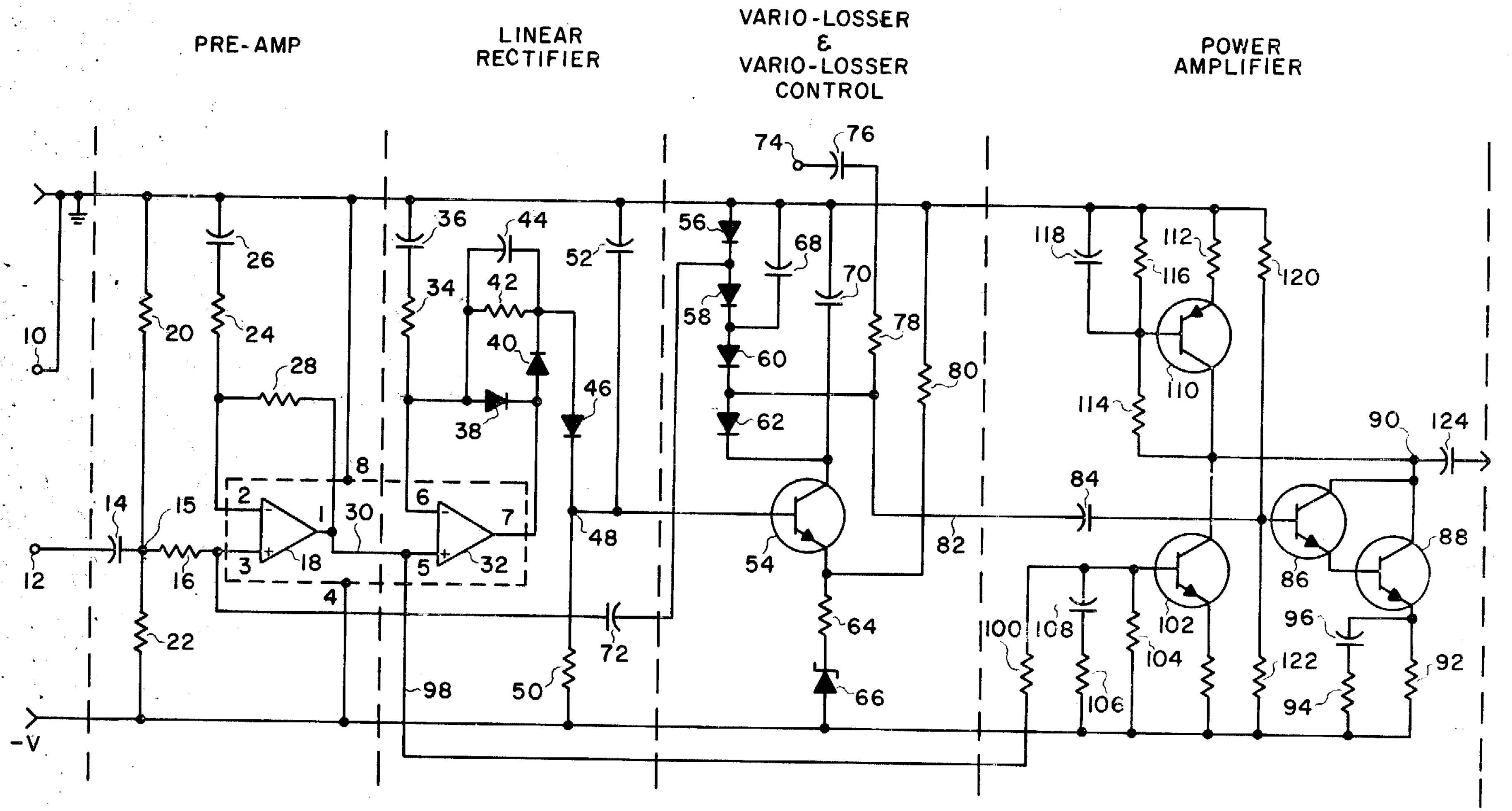
FIG. 1 is a schematic diagram of the compressor circuitry according to the invention.

Referring to FIG. 1, there is shown a compressor circuit in accordance with the present invention, the circuit including vertical dotted lines with titles between the dotted lines to indicate the function performed by the defined portion of the circuit. As shown, the circuit includes a preamplifier section, a linear rectifier section, a variolosser and variolosser control section, and a power amplifier section. The actual compressor circuit includes all portions except the power amplifier circuit.

The input or voice signals are applied at the input terminals 10 and 12, the terminal 10 being grounded, with the terminal 12 being connected through a blocking capacitor 14 through a resistor 16 to the noninverting input of an operational amplifier 18. The point 15, intermediate between the capacitor 14 and resistor 16, is the center tap of voltage dividing resistors 20 and 22, which are connected in series between a negative source of voltage (−V) and ground. The inverting input of operational amplifier 18 is connected to ground through resistor 24 in series with capacitor 26, this input also being coupled to the output of the amplifier 18 through feedback resistor 28. This circuit comprises a conventional amplifier circuit with the output of amplifier 18 being amplified voice frequency signal. This output is transmitted over lead 30 to the noninverting input of a second operational amplifier 32, the inverting input thereof being coupled to ground through resistor 34 in series with capacitor 36. The anode of a first diode 38 is coupled to the inverting input of amplifier 32 while the cathode of diode 38 is coupled to the output and simultaneously to the anode of a second diode 40. The cathode of diode 40 is coupled to the inverting input of amplifier 32 through a parallel power circuit consisting of resistor 42 and capacitor 44.

Operational amplifier 32 is connected as a conventional voltage doubler, the output appearing at the cathode of diode 40 being transmitted through diode 46 to provide a DC output at lead 48, which is connected to the cathode of diode 46. Lead 48 is connected through resistor 50 to the negative source of voltage, is connected to ground through a charging capacitor 52, and is connected to the base of NPN transistor 54.

The variolosser and variolosser control section of the schematic includes a pair of variolossers connected in the collector-emitter circuit of transistor 54. Commencing with ground there includes a first diode 56 having the anode thereof coupled to ground with the cathode thereof coupled to the anode of a second diode 58, the cathode thereof being coupled to the anode of a third diode 60, the cathode thereof being coupled to the anode of a fourth diode 62, the cathode thereof being coupled to the collector of transistor 54. The emitter of transistor 54 is connected through a resistor 64 to the cathode of a Zener diode 66, the anode of diode 66 being coupled to the negative source of voltage.

Diodes 56 and 58 comprise a first variable loss device, while diodes 60 and 62 comprise a second variolosser. The anode of diode 60 is coupled to ground through capacitor 68 while the cathode of diode 62 is coupled to ground through a second capacitor 70.

The noninverting input of amplifier 18 is coupled through capacitor 72 to the first diode variolosser at a point intermediate to diodes 56 and 58. A pilot tone designated $f_c$ is inserted at terminal 74 through DC blocking capacitor 76 through resistor 78 to the second diode variolosser at a point intermediate to diodes 60 and 62. The pilot tone is a predetermined frequency adjacent the voice passband of the channel. For example, frequency components of the voice signal being transmitted will be in the 300 to 3000 Hz passband, with the pilot tone frequency being 3400 Hz or greater. Thus, the pilot tone is not restricted to 4000 Hz, but will occupy a position in the frequency spectrum which minimizes interference with the voice signals. Pilot tones of 6000 Hz or higher may be employed where the available channel bandwidth permits such use. The pilot tone is transmitted at a predetermined known reference power level. The emitter of transistor 54 is also coupled to ground through resistor 80.

In the power amplifier section the attenuated pilot tone signal is transmitted from the cathode of diode 60 over lead 82 through blocking capacitor 84 to the base of NPN transistor 86, which is coupled as a Darlington amplifier to second NPN transistor 88. The collectors of transistors 86 and 88 are coupled together at junction 90, while the emitter of transistor 88 is coupled to the negative voltage source through resistor 92 in parallel with series RC circuit consisting of resistor 94 and capacitor 96.

The preamplified voice signals appearing at the output of amplifier 18 are transmitted over lead 30, over lead 98 through resistor 100 to the base of NPN transistor 102. The base of transistor 102 is coupled to the negative voltage source through resistor 104 in parellel with series RC circuit including resistor 106 and capacitor 108. The collector of transistor 102 is connected to junction 90, which is also connected to the collector of PNP transistor 110, the emitter thereof being coupled to ground through resistor 112. The collector and base of transistor 110 are interconnected to feedback resistor 114, while the base of transistor 110 is also connected to ground through a parallel RC circuit consisting of resistor 116 and capacitor 118. The base of transistor 86 of the Darlington amplifier is connected to ground through resistor 120 and to the negative source of voltage through resistor 122. The output appearing at junction 90 is transferred out to the transmission media through a blocking capacitor 124.

In operation, the voice signals are applied to the input terminals 10 and 12 where they are preamplified at amplifier 18. The voice signals are also brought to the first diode variolosser at a point intermediate diodes 56 and 58. Each of the diode variolossers is a part of a voltage divider that is a variable loss device, and each has a variable impedance in accordance with the DC current flowing through the diodes.

As the noninverting input of amplifier 18 is coupled to the first diode variolosser, the input of amplifier 18 will see a variable impedance determined by the amount of controlled current flowing through the variolossers. The controlled current is determined by the voltage appearing at the base of transistor 54. The control of the base voltage is determined by the output of preamplifier 18 being transmitted over lead 30 to the input of the linear rectifier amplifier 32. Amplifier 32 in conjunction with diodes 38 and 40, resistors 34 and 42 and capacitors 36 and 44 forms a conventional voltage doubling circuit with output diode 46 converting this to a peak voltage detector. The output of diode 46 charges capacitor 52, which is then discharged through resistor 50 to give a fast attack and slow delayed response characteristic.

Control transistor 54 operates at a given predetermined reference level established by the voltage rating of Zener diode 66. Once the voltage level of Zener diode 66 is exceeded, transistor 54 then begins to regulate the amount of direct current flowing through the first and second variolossers connected in series and through the collector to emitter branch of transistor 54. The amount of current flowing is proportional to the output appearing at point 48, this output being directly proportional to the energy of compressed voice signals with the result being increased attenuation to the variolossers with an increase in voltage appearing at point 48.

The amount of compression applied to the voice signals will be sensed by the variolosser associated with the pilot tone. For ease of description, the variolosser and variolosser control section has been redrawn in FIG. 2 with corresponding parts thereof being correspondingly numbered to the designations in FIG. 1. The input terminals designated "voice signal" correspond to the signal appearing at the noninverting input of amplifier 18; the input terminals designated "pilot tone" represent the input at terminal 74, while the input designated "dc" is effectively the output of diode 46 of the linear rectifier section of FIG. 1. As can be seen, the second diode variolosser including diodes 60 and 62 is in series with the DC controlled current, but the diodes 60 and 62 are connected in parallel for the AC signal current by virtue of capacitors 68 and 70. The value of capacitors 68 and 70 can be for example 100 microfarads and 10 microfarads, respectively, to provide a low AC impedance. With this type of connection, the point intermediate to diodes 60 and 62 provides AC voltage dividing action with the voltage divider including capacitor 76, resistor 78 in series with the parallel combination of diodes 60 and 62 in parallel with capacitors 68 and 70, respectively. This voltage dividing action passes through DC blocking capacitors 84 to the terminal designated "output". The impedance of the parallel portion of the voltage divider, previously discussed, is a function of the amount of DC control current passing through diodes 60 and 62, as determined by the DC level of signal appearing at the base of transistor 54. The terminals designated "output" represent the output of the pilot tone and include the information relating to compression applied to the voice signals.

Figures 2, 5:
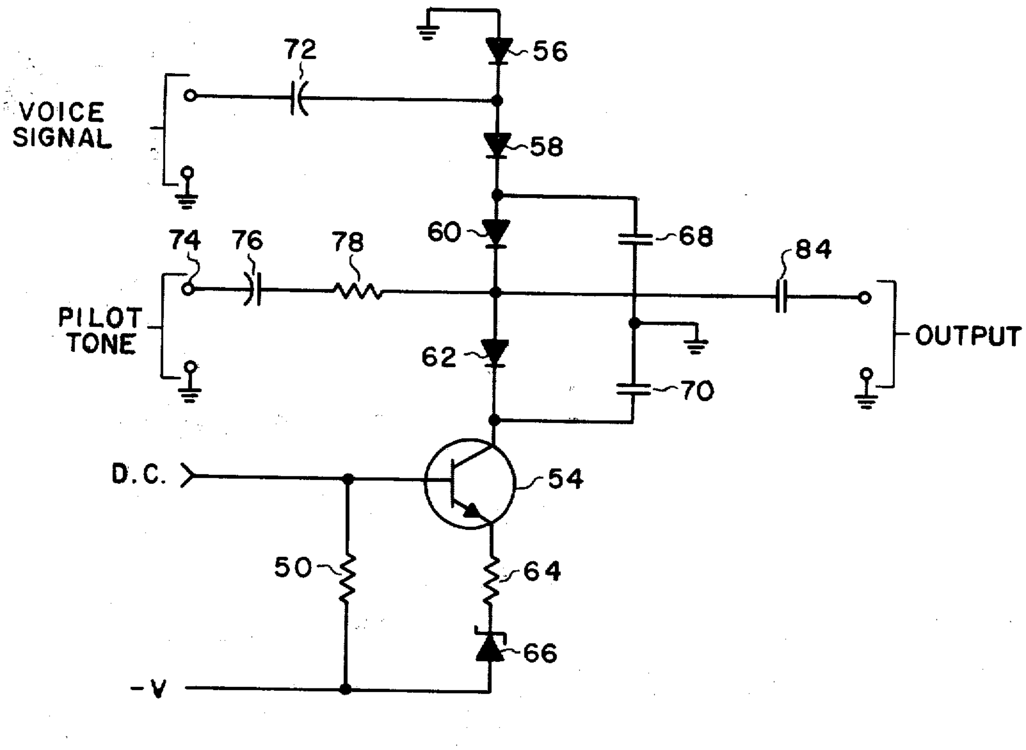

Returning to FIG. 1, the "output" of FIG. 2 is applied to the base of transistor 86, part of a Darlington compound (transistors 86 and 88), which provides a constant current source of the modified pilot tone at junction 90. Similarly, the AC voice signal appearing on lead 98 is applied to the base of transistor 102 providing a constant current source of the voice signal, which also appears at junction 90. Transistor 110 effectively provides a low impedance direct current path but a high impedance AC path so that junction 90 is an adding or summing point. The two currents indicative of the pilot tone and voice signal are added together at junction 90 and converted to a voltage signal for transmission through DC blocking capacitor 124 to the transmission media.

Figure 3:
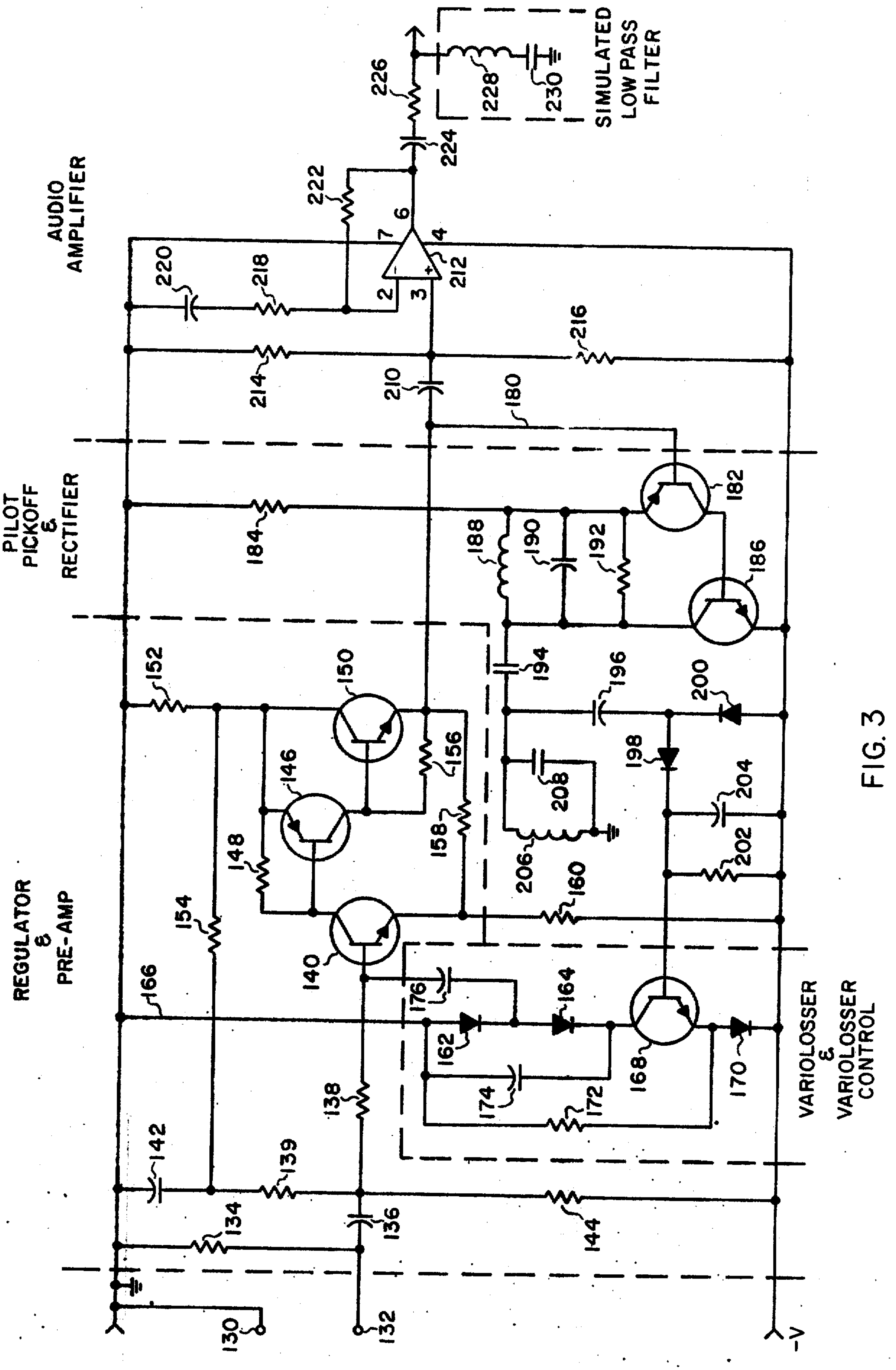
FIG. 3 is a schematic diagram of the expander in accordance with the invention.

Referring now to FIG. 3, the expander portion of the system will be described. While the term expander is utilized as will hereafter be discussed, the portion of the system at the receiving terminal is more in the nature of a regulator rather than a conventional expander. The expander is divided by dotted lines to indicate functional portions entitled "regulator and preamplifier", "pilot pickoff and rectifier," "variolosser and variolosser control", "audio amplifier" and "simulated lowpass filter."

The output of the transmission line is transferred to the input terminals 130 and 132, with terminal 130 being connected to ground and resistor 134 being coupled across terminals 130 and 132. Terminal 132 is connected through DC blocking capacitor 136, through series resistor 138 to the base of NPN transistor 140. The point intermediate to capacitor 136 and resistor 138 is connected through resistor 139 in series with capacitor 142 to ground, as simultaneously the point is connected through resistor 144 to a negative source of voltage (−V). The collector of transistor 140 is coupled to the base of a PNP transistor 146 which has the emitter thereof coupled to the base through resistor 148. The collector of transistor 146 is coupled to the base of NPN transistor 150, which has the collector thereof connected to ground through resistor 152, the collector also being coupled through resistor 154 to the point intermediate resistor 139 and capacitor 142. The emitter of transistor 150 is connected to the collector of transistor 146 through feedback resistor 156, the emitter also being connected through resistor 158 to the emitter of the first transistor 140. The emitter of the transistor 140 is connected to the negative source of voltage through resistor 160. Transistors 140, 146, and 150 comprise an amplifier which provides linear amplification with the gain controlled by the ratio of resistor 158 to resistor 160. The input signal appearing at the base of transistor 140 is determined by the impedance of the variolosser connected to the base thereof.

The variolosser includes diode 162 and diode 164, the DC control path therethrough being from ground over lead 166 through the anode of diode 162 through the cathode thereof to the anode of diode 164, from the cathode thereof to the collector of controlled transistor 168 (NPN transistor), through the emitter thereof through diode 170 to the negative voltage source. The emitter of diode 168 is coupled through series resistor 172 to the ground lead 166. A first capacitor 174 is connected between the anode of diode 162 and the cathode of diode 164, while a second capacitor 176 is coupled between the cathode of diode 162 and the base of transistor 140.

The output of the preamplifier appearing at the emitter of transistor 150 is passed to the pilot pickoff and rectifier portion of the circuit applied over lead 180 to the base of PNP transistor 182, the emitter thereof being coupled to ground through resistor 184. The collector of transistor 182 is coupled to the base of NPN transistor 186, which has the emitter thereof coupled to the negative source of voltage. The emitter of transistor 182 is coupled to the collector of transistor 186, with a parallel LRC circuit disposed therebetween, including inductor 188, capacitor 190, and resistor 192. The 186 collector is also coupled through capacitor 194 through capacitor 196 to the anode of diode 198 and to the cathode of diode 200. The anode of diode 200 is connected to the negative source of voltage, while the cathode of diode 198 is connected to the base of transistor 168. The cathode of diode 198 is also coupled to the negative voltage source by means of a parallel RC filter including resistor 202 and capacitor 204. The point intermediate capacitor 196 and capacitor 194 is connected to ground through a parallel LC circuit including inductor 206 and capacitor 208.

The emitter of transistor 150 is coupled through DC blocking capacitor 210 to the noninverting input of operational amplifier 212 of the audio amplifier section. The above input is also tied to the center of a voltage divider including series resistors 214 and 216 being connected between ground and the negative voltage source. The inverting input of operational amplifier 212 is connected to ground through a series RC network including resistor 218 and capacitor 220, the inverting input also being coupled to the output through feedback resistor 222. The output of audio amplifier 212 passes through capacitor 224 through series resistor 226 to provide the output. At the output end a simulated lowpass filter is provided by means of a series LC circuit to ground including inductor 228 and capacitor 230.

In operation the diode variolosser including diodes 162 and 164 operate in substantially similar fashion to the diode variolosser including diodes 60 and 62 of FIG. 1. Essentially, the base of transistor 140 sees a variable impedance determined by the amount of direct current flowing through the diodes 162 and 164. The input appearing at terminals 130 and 132 include the combined voice signal energy along with the pilot tone, the pilot tone operating from a fixed known reference power level at the transmitter end. Consequently, any gains or losses created by the transmission media will be evident in the pilot tone. Furthermore, the pilot tone also carries the compression information as well as the line loss information. The combined AC signal will pass through the Darlington amplifier (including transistors 140, 146, and 150) to provide an amplified AC signal at the emitter of transistor 150. This signal also appears at the base of transistor 182 by passing over line 180, the transistors 182 and 186 comprising a selectively tuned amplifier circuit, tuned to transmit only the pilot tone frequency. This pilot tone frequency is then rectified by diodes 198 and 200 to apply a DC control signal to the base of transistor 168, the conduction of transistor 168 determining the impedance of the variolosser device including diodes 162 and 164. Consequently, it can be seen the input to the tuned amplifier is determined by the power of the rectified pilot tone signal. Resistor 172, connected between the emitter of transistor 168 and ground, biases diode 170 into conduction all the time, to provide a reference voltage level of, for example, 1.2 volts which would be required on the voltage doubler (diodes 198 and 200) before the DC amplifier transistor 168 starts operating or regulating. Once this reference voltage level is exceeded, then the current from the collector of transistor 168 flows through the two diodes 162 and 164, these two diodes working as a variable resistor. The variolosser then references the output pilot signal against the reference voltage created by diode 170.

As a consequence, the expander operates on the pilot frequency which carries the compression information as well as any gain or loss information due to the transmission media. As a result, when the expander expands upon this pilot tone, it not only restores the level that was taken out by the compressor, but it also restores any losses or gains introduced over the transmission media. The transmission errors are corrected and a voice signal energy is thus expanded in the same operation.

The output of the expander which includes the regulator and preamplifier section, the pilot pickoff and rectifier section, and the variolosser and variolosser control section is then applied to the input of the audio amplifier 212 to the output system. The lowpass filter provides a path for the pilot tone to ground, the inductor 228 and the capacitor 230 being selective to provide a short circuit to ground for the pilot tone only.

FIGS. 4 and 5 represent experimental results in tabular form from testing the completed compandor. FIG. 4 presents the result of applying continuous input power, $P_{in}$, at the input terminals 10 and 12 at three frequencies within the voice signal passband (1 kHz, 300 Hz, and 3 kHz) with column designated $P_o$ being output power across a load resistor at the output of the expander. The upper portion of FIG. 4 shows the results received with a simulated loss equal to 0 dB while the results of the lower portion of the table used a simulated line loss of 10 dB. FIG. 5 presents the results of applying an amplitude modulated 1 kHz tone to the input terminals and measuring the output power reading with, respectively, from left to right, a selectively tuned voltmeter, an average reading meter, and an RMS meter. The 1 kHz tone was modulated with a square wave whose frequency was that of nominal syllabic rate to give an indication of compandors operating with a voice signal. As each type of meter has a typical response time, they were read in parallel for the observer to take his own heuristic average. As can be seen from the experimental results shown in FIGS. 4 and 5, the compression and expansion results utilizing the above described system are within good tolerance limits for a voice signal transmission system.

While it has been shown and described in a preferred embodiment, it is to be understood that various other adaptations and modifications of the teaching may be made within the spirit and scope of the invention.

What is claimed is:

1. In a telephone transmission system for communicating voice signals having frequencies within a passband that is more narrow than the bandwidth of an associated voice channel and having a transmitting terminal and a receiving terminal interconnected by a transmission medium, the combination:

wherein the transmitting terminal comprises means responsive to the voice signals for generating a direct current control signal;

means for generating a pilot tone of a fixed power level at a predetermined audio frequency outside the voice signal passband and within the channel bandwidth;

means responsive to the direct current control signal for simultaneously compressing the volume range of the voice signals and adjusting the level of the pilot tone such that the relative output levels thereof are the same as the relative input levels thereto;

and means for combining the compressed voice signals and adjusted pilot tone and applying the combined output to the transmission medium; and wherein the receiving terminal comprises means responsive to the adjusted pilot tone in a received signal for compensating for losses caused by the transmission medium while expanding the compressed voice signals so transmitted to a predetermined volume range.

2. The combination according to claim 1 wherein said generating means is responsive to compressed voice signals from said compressing means for producing said control signal.

3. The combination according to claim 1 wherein said compressing means comprises first and second variable loss devices connected so as to have the impedances thereof simultaneously varied by the direct-current control signal; said compressing means causing the voice signals and the pilot tone to be associated with different ones of said first and second variable loss devices for effecting compression and adjustment thereof.

4. The combination according to claim 3 wherein said last-named means which is at the receiving terminal includes a third variable loss device that is controlled in response to the adjusted pilot tone for effecting expansion of the compressed voice signals and compensation for losses caused by the transmission medium.

5. The combination according to claim 4 wherein said first, second, and third variable loss devices are diode variolossers.

6. The combination according to claim 5 wherein said first and second diode variolossers are connected in series to pass said direct current control signal therethrough.

7. The combination according to claim 6 wherein said second diode variolosser includes a pair of capacitors so connected to place the diodes thereof in series with respect to said direct current control signal and in parallel with respect to said pilot tone.

8. The combination according to claim 7 wherein said last-named means includes rectifying means selectively tuned to rectify said pilot tone.

9. The combination according to claim 8 wherein said last-named means includes a direct current amplifier responsive to the rectified pilot tone to vary the direct current through said third diode variolosser.

10. The combination according to claim 9 wherein said direct current amplifier is biased to provide a reference voltage level to regulate said third diode variolosser against said reference voltage.

11. The combination according to claim 10 wherein said pilot tone is a selected frequency ranging from 3400 to 6000 Hz.

* * * * *